| United States Patent [19] | [11] 3,907,312 |
| Fletcher et al. | [45] Sept. 23, 1975 |

[54] SYSTEM FOR ENHANCING TOOL-EXCHANGE CAPABILITIES OF A PORTABLE WRENCH

[76] Inventors: James C. Fletcher, Administrator of the National Aeronautics and Space Administration, with respect to an invention of Ray E. Marlow, Huntsville, Ala.

[22] Filed: Aug. 9, 1973

[21] Appl. No.: 387,095

[52] U.S. Cl.............. 279/89; 29/26 A; 279/1 B; 279/107; 294/86.33; 294/116
[51] Int. Cl............................................ B23b 31/02
[58] Field of Search............ 64/4; 279/89, 107, 1 B, 279/108, 1 TS; 294/86.31, 86.33, 86 A, 116, 294/90; 83/698; 29/26 A

[56] References Cited
UNITED STATES PATENTS

| 2,924,483 | 2/1960 | Koch et al. ..................... 294/86 A |
| 3,028,770 | 4/1962 | Pittwood .......................... 279/1 TS |
| 3,596,917 | 8/1971 | Meyer .................................. 279/89 |
| 3,709,623 | 1/1973 | Stephan et al. ..................... 29/26 A |
| 3,759,336 | 9/1973 | Marcovitz et al. ................. 279/1 B |

Primary Examiner—J. M. Meister
Assistant Examiner—Z. R. Bilinsky
Attorney, Agent, or Firm—Wayland H. Riggins; L. D. Wofford, Jr.; John R. Manning

[57] ABSTRACT

An improved system for enhancing the tool-exchange capabilities of a portable wrench. The system is characterized by a sleeve telescopically received by the housing of a wrench motor and a pressure-responsive catch supported by the sleeve for alternately grasping and releasing tools coaxially aligned with the wrench and seated within a tool receptacle.

7 Claims, 16 Drawing Figures

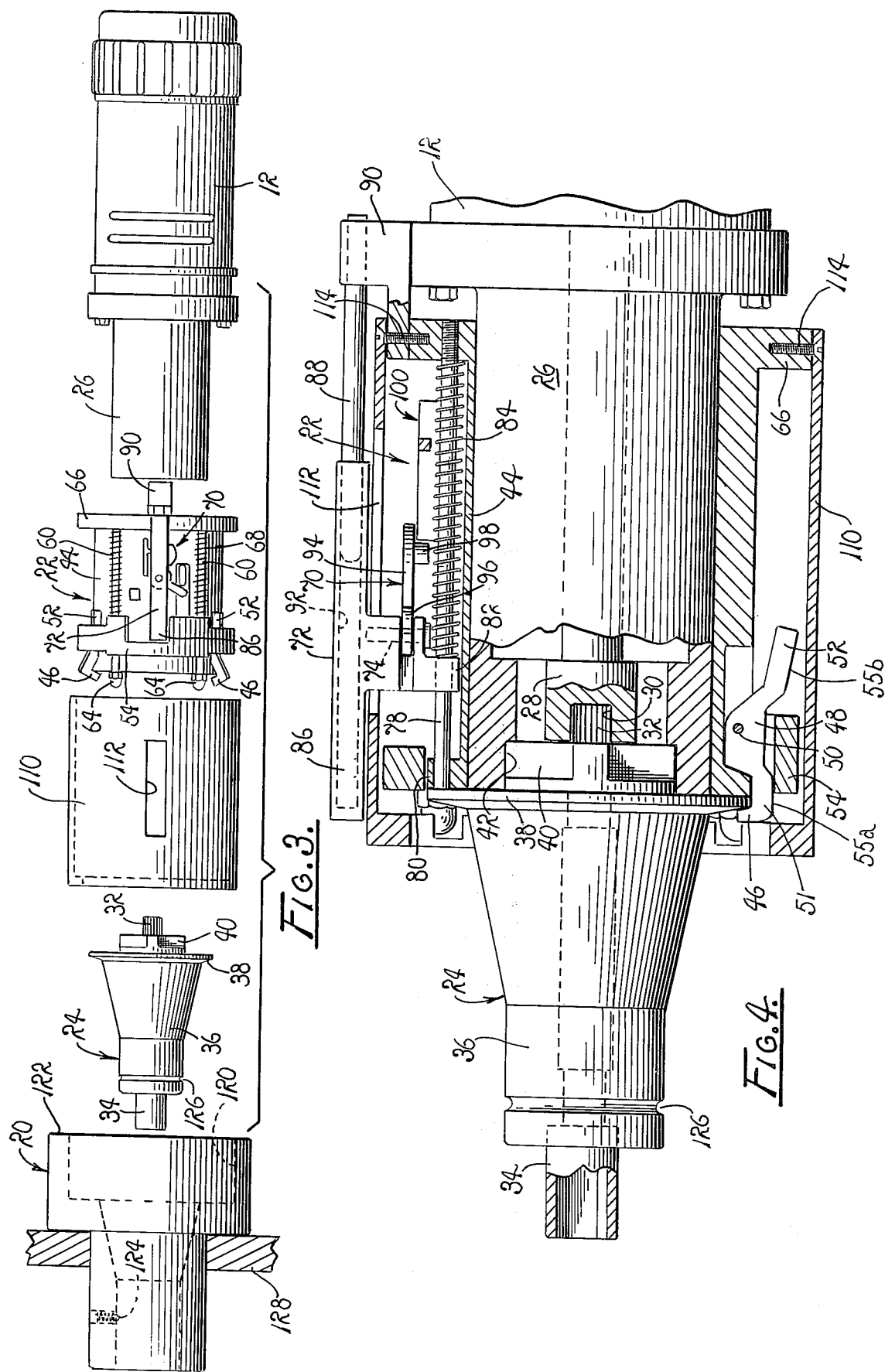

SYSTEM FOR ENHANCING TOOL-EXCHANGE CAPABILITIES OF A PORTABLE WRENCH

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The invention relates generally to portable wrenches and more particularly to an improved system for enhancing the tool-exchange capabilities of portable wrenches of a type particularly suited for use with remote manipulators.

In performing operations in environments hostile to man it often is desirable to utilize remote manipulators for controlling powered wrenches and the like for driving or manipulating tools. Consequently, a new generation of remote manipulators adapted to replace man is emerging in order to meet existing needs. To impart to remote manipulator systems even greater versatility, efforts constantly are being made to enhance the tool-exchange capabilities of powered wrenches. However, such efforts often have been frustrated due to weight, bulk and complexity factors which attend attempts to provide practical mechanisms capable of achieving a positive coupling, uncoupling and exchange of tools.

Moreover, efforts are being made to increase the productivity of amputees fitted with prosthetic devices through a use of mechanisms generally classifiable as remote manipulators. In such instances the prosthetic devices employed are made to function in much the same manner as remote manipulators employed in hostile environments.

It is therefore a purpose of the instant invention to provide an improved system which enhances the tool-exchange capabilities of powered wrenches suited for use with remote manipulators.

OBJECTS AND SUMMARY OF THE INVENTION

It is therefore an object of the instant invention to provide an improved system for enhancing tool-exchange capabilities for powered wrenches.

It is another object to provide an improved system particularly suited for use in coupling tools mated with remotely operable wrenches.

It is another object to provide an improved system for use in coupling tools with wrenches adapted for use with remote manipulators.

It is another object to provide a system for use with a remotely operable wrench which includes a catch having a plurality of pressure-responsive fingers for alternately grasping and releasing tools supported in a tool receptacle, in response to a release of pressure intermittently applied to the wrench.

These and other objects and advantages are achieved through a use of a system including a catch adapted to be telescopically received by a wrench motor and having pressure-responsive fingers mounted on a supporting sleeve for alternately grasping and releasing coaxially aligned tools seated in a tool receptacle and mated with the motor, all in response to intermittent release of axially directed pressures applied to the motor, as will hereinafter become more readily apparent by reference to the following description and claims in light of the accompanying drawings.

BRIEF DESCRIPTION OF THE DRAWINGS

FIG. 3 is a partially exploded view of the system of the instant invention.

FIG. 4 is a fragmented, partially sectioned side elevation of the catch, illustrating one manner in which the catch is employed for securing the tool in coupled relation with a drive shaft provided for the wrench motor.

DESCRIPTION OF THE PREFERRED EMBODIMENT

Figure 1:
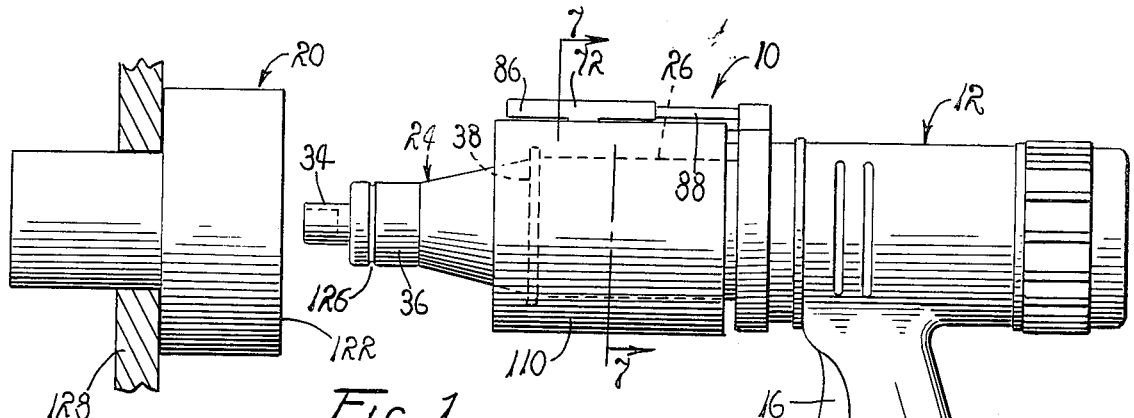
FIG. 1 is a side elevation of a system which embodies the principles of the instant invention, including a tool receptacle and a catch telescopically received by the housing of a wrench motor supporting a tool in mated relation with the motor.

Referring now to the drawings wherein like reference characters designate like or corresponding parts throughout the several views, there is shown in FIG. 1 an improved system, generally designated 10, for enhancing the tool-exchange capabilities of a portable, powered wrench 12.

It is here important to note that the wrench 12, as depicted in the drawings, is an impact wrench having a pistol grip 14 including a trigger 16 seated therein. However, it is to be understood that the particular structure employed in supporting and controlling the wrench 12 is dictated by ancillary factors such as the environment in which the wrench is employed, and/or the type of manipulator with which the wrench is employed. Therefore, it will be appreciated that the pistol grip 14 and the trigger 16 merely represent a type of support and control mechanism capable of being utilized in supporting and controlling the wrenches 12.

Turning now to FIG. 3, the system 10 includes a tool receptacle, generally designated 20, and a catch, generally designated 22. The catch 22 is employed for releasibly coupling a tool, generally designated 24, with the wrench 12. As a practical matter, the wrench includes a housing 26 of a cylindrical configuration, FIG. 3, within which there is disposed a wrench motor, not shown, but of any suitable design.

As best shown in FIG. 4, a driven shaft 28 is concentrically related with the housing 26 and is coupled with the motor to be driven in rotary motion. The distal end of the shaft 28 is provided with a socket 30, having suitable splines, for receiving therein the adjacent end of a splined shaft 32 extended from the tool 24. Hence, it is to be understood that the splined shaft 32 is coupled with the shaft 28.

As a practical matter, the splined shaft 32 terminates at its base in a suitable fitting 34, such as a wrench socket and is supported for rotation within a casing, designated 36. It should be apparent, therefore, that the casing 36 serves as a support for the fitting 34 as rotary motion is imparted thereto by the shaft 28, via the splined shaft 32. Thus a seating of the splined shaft 32 within the splined socket 30 achieves a mating of the tool 24 with the motor of the wrench 12.

The casing 36 is supported by an annular flange 38 provided at its base, as will hereinafter be more fully appreciated. Additionally, in order to inhibit rotation of the casing 36 as rotary motion is imparted to the splined shaft 32, the casing is provided with a rigidly projected cruciform 40 seated within a suitably configured relief 42 provided in the adjacent end of the housing 26.

Coupling of the tool 24, in a mated relation with the wrench 12, is effected through the catch 22. As a practical matter, the catch 22 is supported by a sleeve 44 telescopically received in a concentric relationship with the housing 26. The particular manner in which the sleeve 44 is affixed to the housing 26 is deemed to be a matter of convenience and can be varied as desired. However, epoxy serves quite satisfactorily for this purpose.

One end, which for the sake of convenience is referred to as the forward end, of the sleeve 44 is provided with an annular array of inwardly projected stops 46. These stops simultaneously engage and thus capture the flange 38 of the casing 36 of the tool 24, as illustrated in FIG. 4. Each of the stops 46 is extended from the distal end of a pivotal finger 48 which, in turn, is seated in a relief, not designated, formed in the external surface of the sleeve. The fingers 48 extend in a direction paralleling the longitudinal axis of the sleeve 44 so that each of the stops 46 is angularly related to the longitudinal axis of one of the fingers 48 and extends radially with respect to the sleeve. As a practical matter, the fingers 48 are spaced at equidistances about the end of the sleeve 44 and are pinned thereto by suitable pivot pins 50 which mount the fingers 48 on the sleeve and serve as fulcrums therefor.

As best illustrated in FIG. 4, each of the fingers 48 is so configured as to be provided with a base 51, from which is extended the stop 46 and lever arm 52 angularly related to the longitudinal axis of the finger. The lever arm 52 extends obliquely outwardly from the sleeve 44 when the stop 46 is extended in a substantially radial direction relative to the sleeve. Consequently, it can be appreciated that by simply depressing the lever arm 52 oscillatory motion of the finger 48 is initiated so that the stop 46 is displaced outwardly, relative to the sleeve 44, as the lever arm 52 is brought into substantial parallelism with the longitudinal axis of the sleeve. Thus, the stops 46 are supported in an annular array, which array is expansible for receiving the flange 38 of the casing 36 of the tool 24 and collapsible for engaging and thus coupling the tool 24 to the housing of the wrench 12. Of course, the array of stops 46 is collapsed as the fingers 48 are pivotally displaced about the pins 50 for positioning the stops in a substantially common plane and in an abutting engagement with the flange 38.

Control over the pivotal oscillation of the fingers 48 is achieved through a locking collar 54 configured as an annulus concentrically related to the sleeve 44. The collar 54 is axially displaceable in rectilinear reciprocation for simultaneously engaging selected external surfaces of the fingers 48. As a practical matter, the outermost surface of the base 51, of the fingers 48, is configured as a cam surface 55a, to be engaged by the locking collar in its extension stroke, while the outermost surface of the lever arms 52 are configured as a cam surface 55b to be engaged by the collar 54 in its retraction stroke. Hence, it can be appreciated that the outermost surfaces of the fingers 48 are configured as angularly related cam surfaces so disposed as to be alternately engaged by the locking collar 54. Moreover, the collar 54 is so dimensioned as to never engage both cam surfaces simultaneously. Thus, a simultaneous pivotal oscillation of the fingers 48 is achieved as axial reciprocation is imparted to the locking collar 54. As should be apparent, the throw of the pivotal oscillation imparted to the fingers 48 is directly proportional to the length of the stroke of rectilinear motion imparted to the locking collar 54 due, in part, to the angular relation of the lever arms 52 to the longitudinal axis of symmetry of the sleeve 44.

The locking collar 54 is provided with a boss 56 integrally related therewith and extended rearwardly in parallelism with the longitudinal axis of the sleeve 44. At the distal end of the boss 56 there is a radially extended, integrally related cam 58. Thus, the cam 58 is provided as an integral component of the locking collar 54 so that axial motion imparted to the cam 58 is transmitted directly to the locking collar 54.

It is here important to note that the locking collar 54 is guided in reciprocation by a plurality of axially extended guide pins 60 received in suitably formed bores 62 extended through the collar. Thus, the collar is permitted to slide along the guide pins as axial reciprocation is imparted thereto. Moreover, each of the pins 60 includes a screw-threaded end portion onto which is screw threaded a stop in the form of a cap 64. The caps 64 thus function as adjustable stops for limiting linear motion imparted to the locking collar 54 in its extension strokes for positioning the collar relative to the base 51 of the fingers 48 whereby the stops 46 are supported against displacement in a radial direction.

The base ends of the guide pins 60 are seated in an annular flange 66 circumscribing the rearward end portion of the sleeve 44 and are mated with the flange 66 by any suitable means including screw threads and the like. If desired, an epoxy can be employed for this purpose quite satisfactorily. In any event, it is to be understood that the locking collar 54 is guided in reciprocation by the guide pins 60 and that the throw of the extension stroke of the locking collar 54 is limited by the caps 64.

Figure 5:
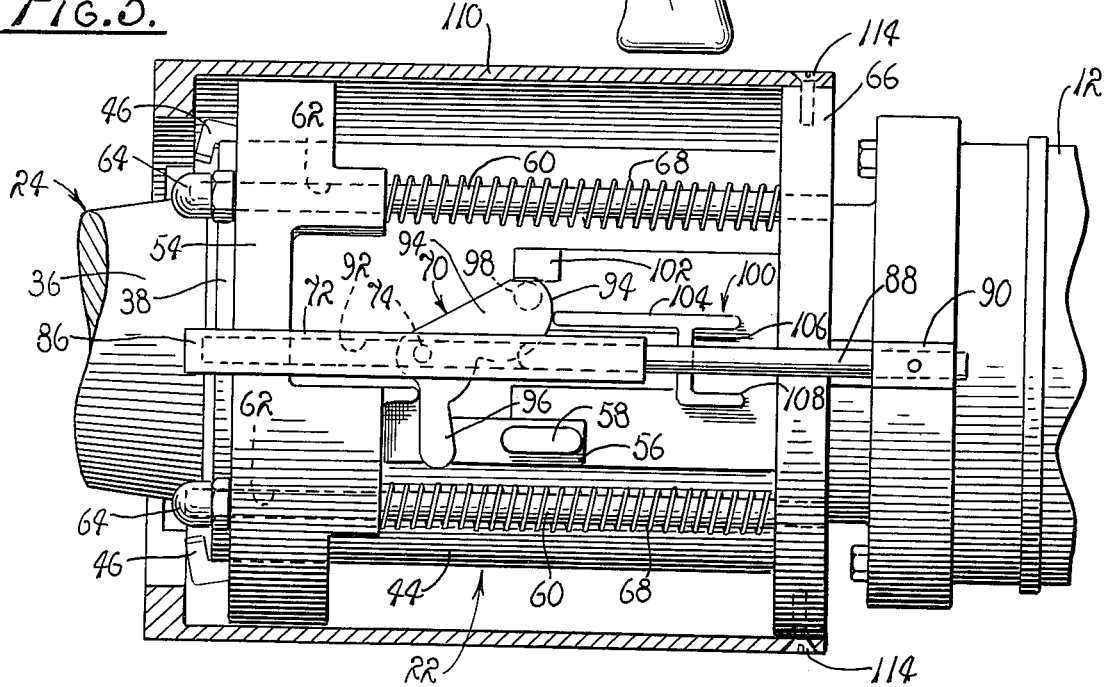
FIG. 5 is a fragmented, partially sectioned view similar to the view of FIG. 4, but rotated through 90°, illustrating a cam and pawl mechanism provided for dictating the sequence of operation for the catch.
Figure 6:
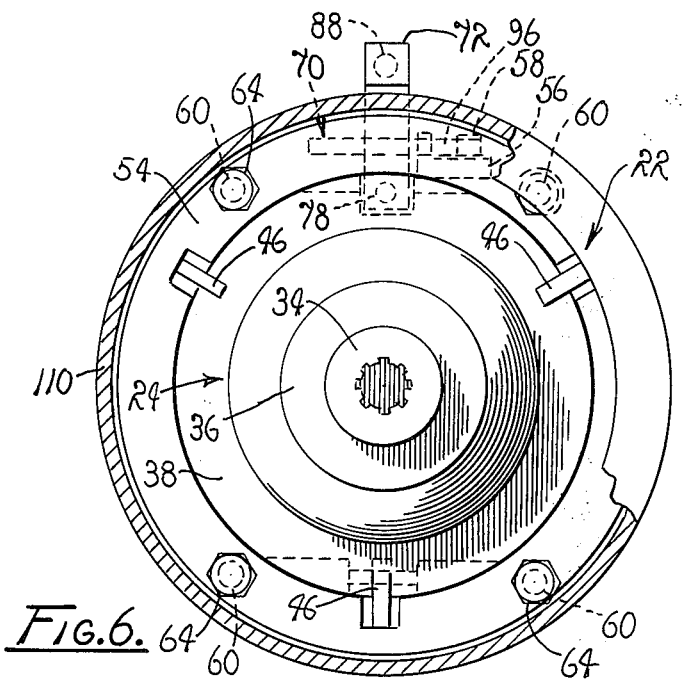
FIG. 6 is a partially sectioned end view of the wrench and tool, as shown in FIG. 1.
Figure 7:
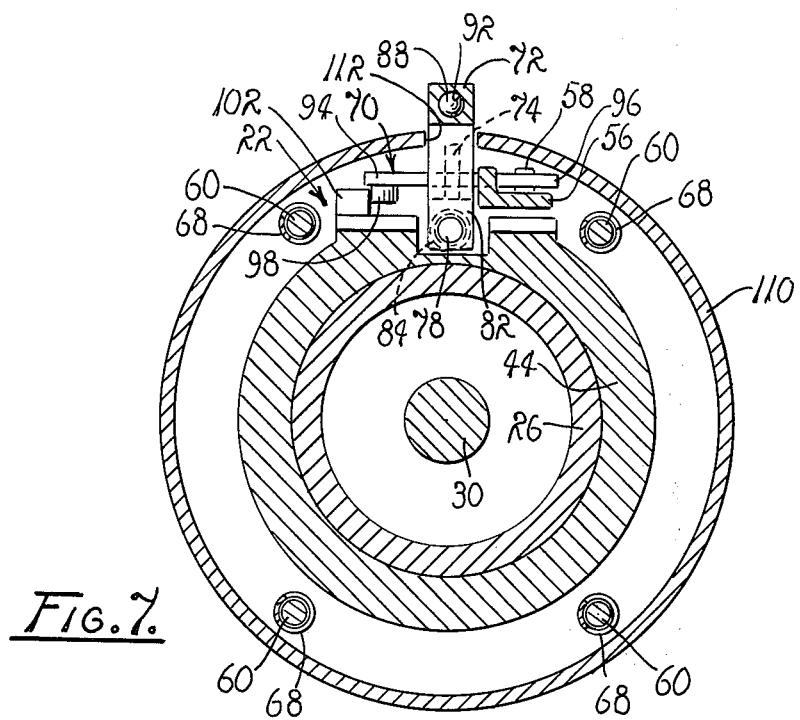
FIG. 7 is a cross-sectional view taken generally along line 7—7 of FIG. 1.

As illustrated in FIGS. 3 and 5, a helical compression spring 68 is received by and concentrically related with each of the guide pins 60 so that it is compressed between the locking collar 54 and the flange 66 as the locking collar is displaced in its retraction stroke. Thus, the locking collar 54 is continuously urged into a seated engagement with the caps 64. Of course, axial motion imparted to the locking collar 54 by the boss 56 is against the forces collectively applied by the plurality of compression springs 68 as the collar is advanced along the guide pins 60.

Axial motion imparted to the locking collar 54, through the boss 56, is achieved through the use of a pivotally supported pawl 70 supported for axial reciprocation by a slide 72. The pawl is pinned to the slide 72 by a pivot pin 74, while the slide is, in turn, supported for axial reciprocation by a guide pin 78, FIG. 4. The guide pin 78 is connected at its base end with the flange 66, through a screw-threaded coupling, not designated, and at its distal or forward end to an annular flange 80 integral with the sleeve 44. As can be observed from a cursory inspection of FIG. 4, the guide pin 78 is disposed inwardly of the slide and extends through a suitable opening, not designated, provided in a foot 82 depending from the slide 72 so that the slide 72 is guided by the guide pin 78 as reciprocation is imparted thereto.

The guide pin 78, like the guide pins 60, is provided with a compression spring 84. This spring is interposed between the flange 66 and the foot 82 so that linear motion of the slide 72, in a retracting stroke, is in opposition to the applied forces of the compression spring. It is important to note that the slide 72 includes an elongated actuator block 86 supported for reciprocation along a telescopically related guide pin 88. The pin 88 is secured at its base end to the flange 66 through a pedestal 90 mounted on the flange 66. A cylindrical opening 92 is extended into the block 86 for receiving the distal end of the guide pin 88. Hence, it can be appreciated that as the actuator block 86 is reciprocated along the guide pins 88, the pawl 70 is coupled with the slide 72.

Figure 2:
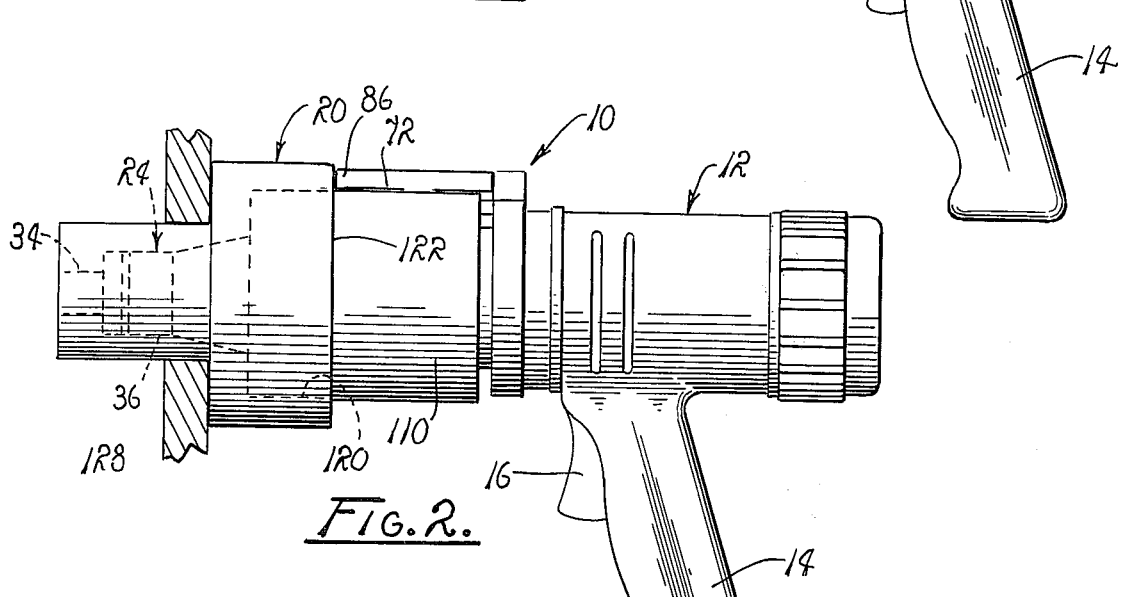
FIG. 2 is a side elevation similar to FIG. 1, illustrating the wrench in received relation with the receptacle.

The distal end surface of the actuator block 86 is so positioned to engage the adjacent surface of the receptacle 20 as the wrench is advanced into close proximity therewith, as shown in FIG. 2. Thus, axial motion is imparted to the block for retracting the slide 72, relative to the receptacle 20, as the wrench 12 is inserted into the receptacle 20 for grasping or releasing a tool 24. Axial motion thus imparted to the slide 72, of course, is against the applied forces of the compression spring 84 and is transmitted to the locking collar 54 as the cam 58 is engaged by the pawl 70. Additionally, axial motion thus imparted to the locking collar 54 is against the applied forces of the compression springs 68. Moreover, axial motion in a reversed direction under the influence of the springs 68 is arrested by the pawl 70 acting against the cam 58. Thus, the instantaneous position of the locking collar 54 relative to the plurality of fingers 48 is dictated by the relative position of the pawl 70 and cam 58.

The pawl 70, in practice, is a bifurcated member which includes a base 94 and an arm 96 projected laterally therefrom. The pivot pin 74 is extended through a suitable opening formed in the pawl near the juncture of the base 94 and the arm 96 so that oscillation of both the base and the arm about the pin is accommodated. It is to be understood that the angular position of the base 94 of the pawl 70 dictates the angular position assumed by the arm 96 of the pawl relative to its path of travel as the slide is reciprocated. The angular position of the base 94, relative to that path, is, in turn, dictated by a cam follower 98 depending from the distal end of the base 94 and a segmented cam 100 and a permanent magnet 102 provided in juxtaposition with the cam 100.

The cam 100 includes a first linear surface 104, a surface 106 orthogonally related to the surface 104 and a linear surface 108 disposed in spaced parallelism with the surface 104. These surfaces consecutively are engaged by the cam follower 98 as the slide 72 is reciprocated in response to rectilinear motion imparted to the actuator block 86, through engagement with the receptacle 20 and the applied recovery forces of the compression springs 68 and 84.

Figure 8A:
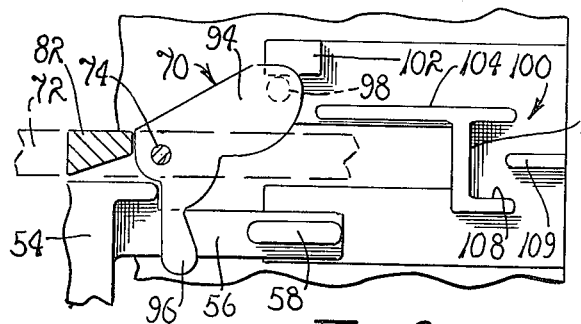
FIGS. 8a through 8i collectively illustrate positions serially assumed by the pawl, of the cam and pawl mechanism, as dictated by their relative position.
Figure 8B:
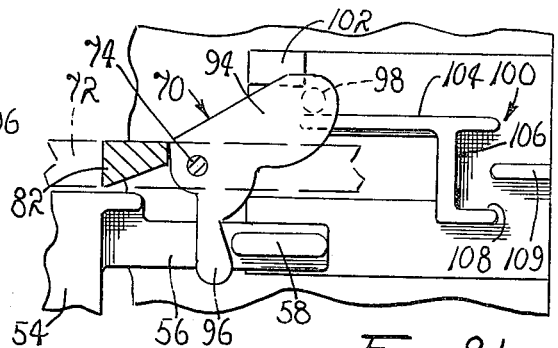
Figure 8C:
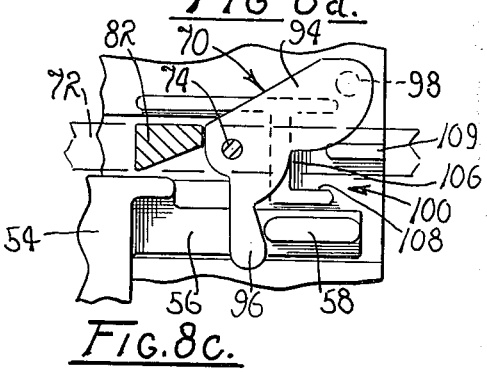
Figure 8D:
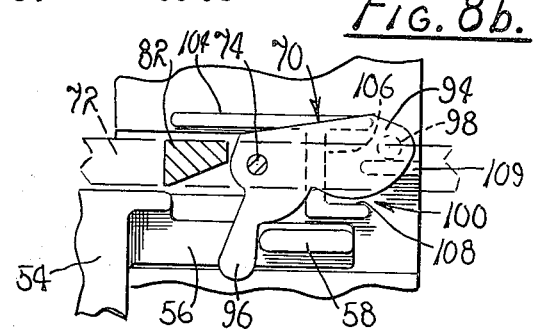
Figure 8E:
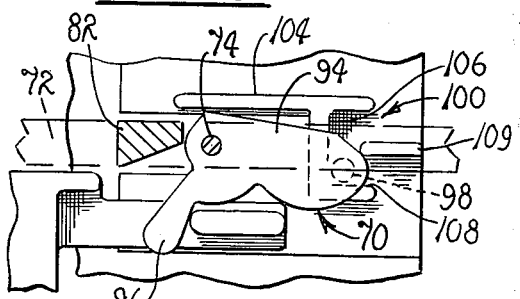

As illustrated in FIGS. 8a through 8i, axial motion imparted to the foot 82 causes the pawl 70 to be retracted. As the pawl 70 is retracted, the cam follower 98 engages the surface 104 of the cam 100 and serves to restrain the pawl 70 against pivotal motion in a first or inward direction. Concurrently therewith, the arm 96 engages the upstanding cam 58 integral with the boss 56. Continued motion imparted to the slide 72 causes the pawl 70 to advance the locking collar 54 against the applied forces of the spring 68, since pivotal motion of the pawl 70 is precluded by the effect of the surface 104 of the articulated cam 100 acting against the cam follower 98, FIG. 8b. However, once the cam follower 98 advances beyond the end surface 104, due to continued motion of the slide 72, pivotal motion of the pawl 70 is accommodated, due to the reactive forces of the springs 68, acting against the pawl 70 through the locking collar 54 and the boss 56. This motion normally is accommodated at the extremity of the retracting stroke imparted to the locking collar 54. Pivotal motion thus imparted to the pawl 70 is arrested by the surface of a stop 109 disposed in close proximity with the articulated cam 100 as the cam follower 98 comes to rest thereagainst. So long as no additional motion is imparted to the actuator block 86, the cam follower 98 remains in engagement with the stop 109 due to the combined effects of the springs 68 and 84. As the wrench 12 is extracted from the receptacle 20, pressure is removed from the actuator block 86 for thereby permitting the springs 68 and 84 to urge the locking collar 54 to move in an extension stroke toward the caps 64. As best illustrated in FIG. 8e, movement of the locking collar 54, in an extension stroke, is arrested as the cam follower 98 engages the arresting surface 106 of the cam 100, and the arm 96 of the pawl 70 restrains the collar against further displacement, through the boss 56.

The position responsively assumed by the locking collar 54, relative to the fingers 48, as the cam follower 98 rests on the surface 106, is best illustrated in FIG. 3. Accordingly, it is to be understood that when the follower 98 is seated against the surfaces 106, as illustrated in FIG. 8e, the locking collar 54 is disposed in engagement with the cam surfaces 55b of the fingers 48 so that the stops 46 are supported in radial displacement with respect to the sleeve 44, as best illustrated in FIG. 3.

Figure 8F:
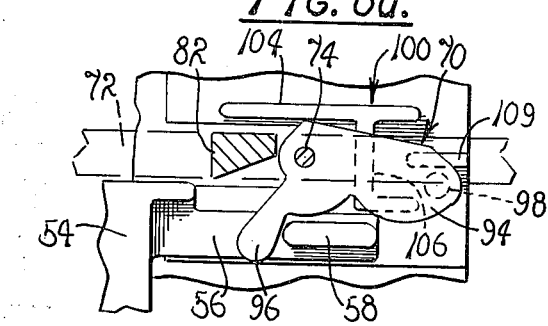
Figure 8G:
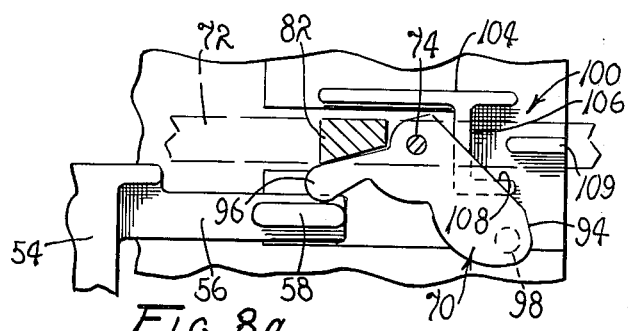
Figure 8H:
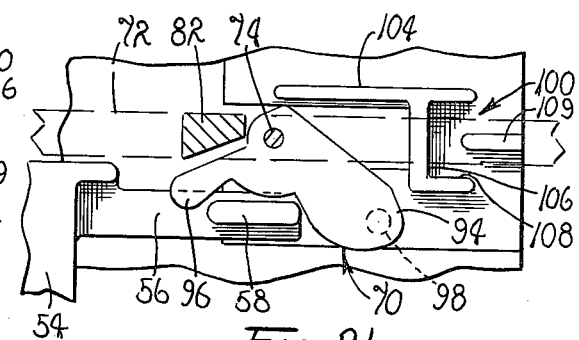
Figure 8I:
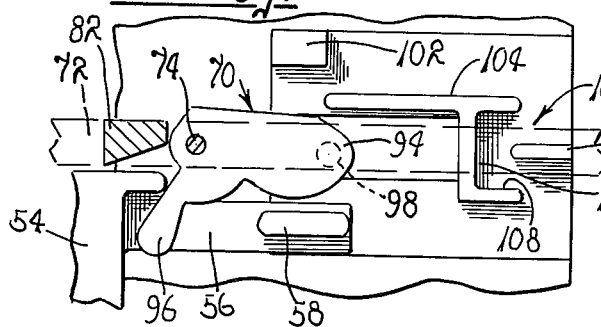

The cam follower 98 is caused to disengage the cam 100 upon further retracting displacement of the slide 72 resulting from additional pressure applied to the wrench 12. Such disengagement occurs as the cam follower 98 is moved along the surface 108, to the terminus thereof, as illustrated in FIG. 8f, as the slide 72 is forced rearwardly. Once the cam follower 98 is advanced beyond the terminus of the surface 108, a release of the locking collar 54 occurs, due to the disengagement of the cam follower 98 with the cam 100. Thus, the pawl 70 is released to rotate about the pivot pin 74 whereupon the cam 58 of the boss 56 is released so that axial movement is imparted thereto by the stored force of the springs 68. Thus, the locking collar 54 is released for axial motion toward a seated relationship relative to the cam surfaces 55a, circumscribing the distal end portions of the fingers 48. When so seated, the locking collar 54 forces the stops 46 to seal in radially extended dispositions relative to the sleeve 44.

Of course, a release of pressure applied to the actuator block 86 permits the spring 84, acting against the foot 82 of the slide 72, to advance the slide 72 to its initial position. In this position, the magnet 102 is effective for causing the pawl 70 to rotate to its initial position, as illustrated in FIG. 8a, whereupon the catch 22 is readied for a subsequent operation.

While not imperative, it is preferred that a sleeve 110 be provided as a fairing for enclosing the locking collar 54 and the fingers 48. A suitable opening 112 is provided within the sleeve 110 through which the actuator block 86 is projected. The sleeve 110 is secured to the sleeve 44 in any suitable manner including screws 114, and the like.

It is noted that the receptacle 20 includes an internal well 120 of a configuration substantially conforming to the external configuration of the tool 24. The well 120 preferably is circumscribed by an annular shoulder 122 against which the actuator block 86 is abutted as the wrench 12 is inserted therein. Additionally, the well 120 is characterized by a spring-loaded ball 124 positioned to be received in an annular groove 126 circumscribing the casing 36 of the tool 24. Thus, the ball 124 is spring-biased into seated relation with the groove 126 as the tool is inserted into the well 120, for supporting the tool therein, and is forcibly cammed therefrom as the tool is extracted from the well.

It is to be clearly understood that the receptacle 20 is supported by any suitable means, represented by a support plate 128 which may include a bulkhead or the like.

OPERATION

It is believed that in view of the foregoing description, the operation of the device will readily be understood and it will be briefly reviewed at this point.

With the system 10 assembled in the manner hereinbefore described and fitted with an appropriately configured pistol grip 14, or the like, the wrench 12 is readied for use in operations performed manually or by remote manipulators or, if desired, by amputees employing prosthetic devices.

Assuming, for purposes of describing the operation of the system 10, that a tool 24 is coupled with the wrench 12 and mated with the motor thereof, as illustrated in FIG. 1. Assuming, further, that it is desirable to exchange the tool 24 for a similar tool, the tool 14 must first be uncoupled from the wrench. This is effected simply by inserting the distal end of the wrench, including the tool 24, into the receptacle 20 as illustrated in FIG. 2. As insertion occurs, the actuator block 86 of the slide 72 engages the annular shoulder 122 causing the block 86 to retract against the applied forces of the spring 84. As the slide 72 is retracted, the cam follower 98 engages the surface 104 of the articulated cam 100 while the arm 96 of the pawl 70 engages the cam 58, projected from the boss 56. A continued movement of the wrench 12 into the receptacle 20 further increases the pressure applied to the actuator block 86 for thus causing the arm 96 of the pawl 70 to forcibly displace the boss 56, through the cam 58, since rotation of the pawl 70 about the pivot pin 74 is precluded by the effect of the surface 104 acting against a cam follower 98. Such displacement of the boss 56 causes the locking collar 54 to advance along the cam surface 55b of the lever arm 52.

As the locking collar 54 advances along the cam surface 55b the fingers 48 are pivoted and the stops 46 are displaced radially for releasing the flange 38. Concurrently, the cam follower 98 is displaced beyond the surface 104 of the articulated cam 100, whereupon the reactive forces of the springs 68 applied to the arm 96 of the pawl 70, via the locking collar 54 and the boss 56, cause the pawl 70 to pivot about the pivot pin 74 into engagement with the adjacent surface of the stop 109, whereupon pivotal motion of the pawl 78 is arrested.

Once the tool 24 is fully inserted into the well 120, the spring-loaded ball 124 seats in the groove 126 and secures the tool 24 within the well 120. Consequently, extraction of the wrench 12 from the receptacle 20 permits the catch 22 to release the tool 24 for disassociating the tool 24 and the wrench 12. Thus, the cruciform 40 is extracted from the relief 42 and the splined shaft 32 is extracted from the splined socket 30.

Retraction of the wrench 12 serves to remove the forces applied axially to the actuator block 86, so that the springs 68 and 84 collectively force the slide 72 and the locking collar 54 in axial displacement toward the caps 64. However, motion of the locking collar 54 is arrested in response to an engagement of the cam follower 98 with the surfaces 106 and 108 of the cam 100. Of course, the cam 58 of the boss 56 is restrained by the arm 96 of the pawl 70. Thus, engagement of the locking collar 54 with the cam surfaces 55b of the lever arms 52 is maintained for supporting the array of stops 46 in an expanded configuration, suitable for receiving therein a flange 38 of another tool 24.

Upon a subsequent selection of a tool 24, the wrench 12 is again advanced axially into a well, similar to the well of a selected receptacle 20, whereupon the actuator block 86 engages the shoulder 122 thereof so that the slide 72 again is retracted for advancing the cam follower 98 along the surface 108 of the articulated cam 100. As the splined shaft 32 of a tool 24 is received within the splined socket 30 of the shaft 28, the tool 24 is mated with the wrench and the flange 38 of the tool 24 is positioned to be received by the array of stops 46. Concurrently, therewith, the cam follower 98 is caused to advance beyond the end of the surface 108 so that the pawl 70 is released and permitted to rotate about the pivot pin 74. This permits the cam 58, acting under the influence of the springs 68, to impart rotation to the pawl 70 for rotating the arm 96 thereof out of its path. Thus, the locking collar 54 is released for return movement toward the caps 64, under the influence of the springs 68, into a seated engagement with the cam surfaces 55a, about the distal end surfaces of the fingers 48, for thereby forcing the stops 46 into locking engagement with the flange 38 of the casing 36 of the tool 24.

Extraction of the wrench 12 from the receptacle 20 now serves to withdraw the tool 24 axially from the well 120 as the spring-loaded ball 124 is cammed from the groove 126. Thus, the tool is readied for operation.

In order to exchange the tool 24, the procedures hereinbefore described are repeated.

In view of the foregoing, it should readily be apparent that the system 10, which embodies the principles of the instant invention, provides a practical solution to the perplexing problem of enhancing tool-exchange capabilities of portable, powered wrenches suited for use with remote manipulators.

Although the invention has been herein shown and described in what is conceived to be the most practical and preferred embodiment, it is recognized that departures may be made therefrom within the scope of the invention, which is not to be limited to the illustrative details disclosed.

I claim:

1. In an improved system for enhancing tool-exchange capabilities of a wrench, the improvement comprising:

a sleeve mounted in circumscribing relation with a wrench motor adapted to impart motion to a tool mated therewith;

pressure-responsive means for coupling a tool to said sleeve comprising a plurality of fingers pivotally coupled to said sleeve, each of said fingers being characterized by means defining at one end thereof a stop extended radially with respect to the sleeve, means defining at the opposite end of the finger a lever arm, and means defining a fulcrum interposed between the ends of the finger, whereby each of the fingers is supported for pivotal oscillation about a fulcrum for displacing a stop in radial directions;

an actuator including an annular member concentrically related with said sleeve and supported for rectilinear reciprocation therealong having an internal camming surface for simultaneously engaging the adjacent surfaces of the said fingers near each of the opposite ends thereof for imparting pivotal motion thereto;

means for imparting rectilinear motion to said annular member;

means for restraining the annular member against linear motion for thereby restraining the fingers against oscillatory motion;

said means for restraining the annular member against linear motion including a cam coupled with said annular member, a pivotally supported pawl for selectively engaging said cam, and means for controlling pivotal motion of said pawl.

2. The system of claim 1 wherein said means for controlling pivotal motion of said pawl includes a segmented cam fixed to said sleeve, and a cam follower fixed to said pawl and supported for engagement with said segmented cam.

3. An improved system for enhancing the tool-exchange capabilities of powered wrenches comprising:

a. a tool receptacle including a well for supporting a tool therein;

b. a sleeve having a base mounted in concentric relation with a wrench motor and adapted to forcibly be inserted axially into said receptacle;

c. pressure-responsive means supported by said sleeve for alternately grasping and releasing tools seated in said receptacle in response to release of pressures applied to the wrench as the sleeve is forcibly inserted into the receptacle;

d. said pressure - responsive means including an annular array of radially displaceable stops coaxially aligned with the distal end of said sleeve;

e. means for imparting radial motion to said stops;

f. said stops comprising angularly related distal end portions of fingers extended in parallelism with the longitudinal axis of said sleeve and supported for pivotal motion in planes radially related to said sleeve;

g. said means for imparting radial motion to said stops including a locking collar concentrically related to said sleeve and supported for rectilinear motion therealong for alternately engaging the opposite end portions of said fingers for pivotally displacing the fingers in opposite directions through a throw proportional to the strokes of linear motion imparted to said locking collar.

4. The system of claim 3 further comprising means for serially varying the strokes of linear motion imparted to said locking collar for thereby serially varying the throw of pivotal displacement imparted to said fingers.

5. The system of claim 4 wherein said means for varying the stroke of linear motion imparted to said locking collar includes:

A. a slide engageable with said receptacle and supported for rectilinear displacement from a rest position to an arrested position, and thence to said rest position;

B. a cam and pawl assembly, the cam of said assembly being integral with said locking collar, the pawl of said assembly being pivotally coupled with said slide; and C. guide means for sequentially positioning said pawl in a cam-lifting configuration, a cam-restraining configuration and a cam-release configuration relative to said cam in response to displacement of the slide from said rest position to said arrested position and subsequently to said rest position.

6. The system of claim 5 further comprising first biasing means continuously urging said locking collar in displacement into circumscribing relation with said array of stops.

7. The system of claim 6 wherein said receptacle includes an annular shoulder coaxially related with said well for engaging said slide.

* * * * *